(12) United States Patent  
Tajima

(10) Patent No.: US 8,283,433 B2
(45) Date of Patent: Oct. 9, 2012

(54) POLYCARBONATE RESIN AND ELECTROPHOTOGRAPHIC PHOTOSENSITIVE BODY USING THE SAME

(75) Inventor: Jun Tajima, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 659 days.

(21) Appl. No.: 12/375,284

(22) PCT Filed: Jul. 31, 2007

(86) PCT No.: PCT/JP2007/065318
§ 371 (c)(1),
(2), (4) Date: Oct. 20, 2009

(87) PCT Pub. No.: WO2008/016161
PCT Pub. Date: Feb. 7, 2008

(65) Prior Publication Data
US 2010/0047703 A1    Feb. 25, 2010

(30) Foreign Application Priority Data

Aug. 2, 2006   (JP) ................. 2006-211505
Dec. 18, 2006  (JP) ................. 2006-340516

(51) Int. Cl.
*C08G 63/02* (2006.01)
*C08G 64/00* (2006.01)
(52) U.S. Cl. ....... 528/196; 430/58.2; 430/58.7; 528/198
(58) Field of Classification Search .................. 399/159; 430/58.7, 59.6; 528/196, 198
See application file for complete search history.

(56) References Cited

U.S. PATENT DOCUMENTS
5,876,892 A    3/1999   Fujimori et al.
2008/0153031 A1  6/2008  Echigo et al.

FOREIGN PATENT DOCUMENTS
JP   9-6036      1/1997
JP   2002-55473  2/2002
JP   2006-213634 8/2006
WO   2005/101127 10/2005

OTHER PUBLICATIONS

Patent Abstracts of Japan of JP 2006-213634 dated Aug. 17, 2006.
Patent Abstracts of Japan of JP 2002-55473 dated Feb. 20, 2002.
Patent Abstracts of Japan of JP 9-6036 dated Jan. 10, 1997.

*Primary Examiner* — Terressa Boykin
(74) *Attorney, Agent, or Firm* — Ladas & Parry LLP

(57) ABSTRACT

The present invention is directed to a polycarbonate resin comprising a structural unit represented by the following general formula (I), wherein the structural unit of general formula (I) occupies 5 to 100 mol % relative to all the structural units, and the limiting viscosity of the polycarbonate resin is 0.3 to 2.0 dl/g:

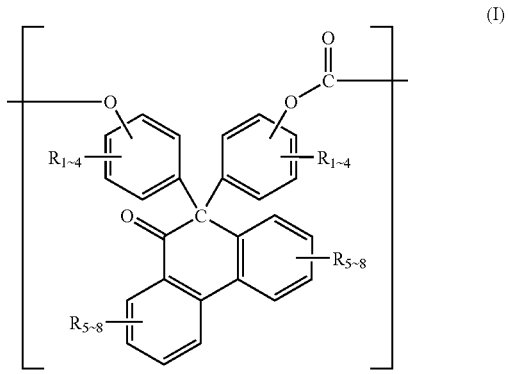

wherein in the formula, $R_1$ through $R_8$ independently represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17.

11 Claims, No Drawings

POLYCARBONATE RESIN AND ELECTROPHOTOGRAPHIC PHOTOSENSITIVE BODY USING THE SAME

TECHNICAL FIELD

The present invention relates to a novel polycarbonate resin having a phenanthrene skeleton, and a heat-resistant film or sheet using the same which is usable for a packaging material, an optical film or the like. The present invention also relates to an electrophotographic photosensitive body produced using the novel polycarbonate resin as a binder.

BACKGROUND ART

Polycarbonate resins are superb in transparency, heat resistance, mechanical strength and the like, and so are widely used in electric, mechanical, automobile, medical and other applications. Especially, in the fields of sheet and film, use of polycarbonate resins is remarkably increasing for packaging materials, optical films, building materials and the like.

In these applications, heat resistance is often required. For example, for food packaging materials, which need to be hygienic, durability against a high temperature of 80° C. or higher used sterilization or filling is required. Also in the field of optical films, improvement in various characteristics is strong desired along with the recent development of flat panel displays including liquid crystal displays, plasma displays, organic EL displays and the like. Desired characteristics include high transparency and optical isotropy, and also heat resistance.

Polycarbonate sheets used for insert molding are required to have good size stability so as to be durable against expansion/shrinkage during and after heating, against wrinkles, and against warping of a molded product, as well as to have heat resistance. A polycarbonate resin production method, by which the rotation rate and the temperature of the take-up roll is controlled within a certain range at the time of melt-extrusion has been proposed (Japanese Laid-Open Patent Publication No. 2001-139705).

However, the above-mentioned production method has the following problems. When producing a sheet having a thickness of 0.5 to 2.0 mm, it is difficult to control the sheeting because, for example, the sheet is adsorbed to the roll due to a high temperature of the roll. In addition, a sheet produced by this method has a large expansion/shrinkage ratio when being heated, which results in a defect that, for example, the design is printed as shifted from the position originally intended. A sheet produced by this method also has a large warping ratio, and so is likely to cause the printing to be unacceptable when being used for name plates or the like in which printing is performed at a high processing speed. During the post-printing drying or transportation stage, such a sheet is largely warped, which declines the process work efficiency and also decreases the production yield.

Meanwhile, electrophotography technologies are widely used today for copiers, laser beam printers (hereinafter, referred to simply as "LBPs"), facsimile machines and the like owing to the high speed, high image quality and the like provided by such technologies.

Conventionally, as electrophotographic photosensitive bodies for the electrophotography technologies, inorganic-based photoconductive substances such as selenium, selenium/tellurium alloys, selenium/arsenic alloys, cadmium arsenide and the like are mainly used. However, recently, from the viewpoints of toxicity, safety, cost, productivity and the like, electrophotographic photosensitive bodies using organic photoconductive substances have been developed. In the case where an organic photoconductive substance has a low molecular weight, such an organic photoconductive substance is usually mixed with a binder resin to form a coating film. Substances used as the binder resin include, for example, vinyl polymers such as polymethylmethacrylate, polystyrene, poly(vinyl chloride) and the like, and copolymers thereof, and various thermoplastic and thermosetting resins such as polycarbonate, polyester, polysulfone, phenoxy resins, epoxy resins, silicone resins and the like. Electrophotographic photosensitive bodies using these binder resins can be easily formed into a thin film by a cast film production method, and thus are suitable to mass production and also are of relatively low cost. Among these various resins, polycarbonate resins have relatively good characteristics, and especially polycarbonate resins from 1,1-bis(4-hydroxyphenyl)cyclohexane are superb in abrasion resistance and electrophotographic characteristics and are used as binder resins (see Japanese Laid-Open Patent Publication No. 63-40159).

Meanwhile, electrophotographic photosensitive bodies provided with a hard coat on a surface thereof and thus having improved abrasion resistance are also developed. This type of electrophotographic photosensitive bodies have high abrasion resistance but the production process thereof is complicated and costly. Therefore, an electrophotographic photosensitive body having improved abrasion resistance and easily produced by the conventional production process is desired (see Japanese Laid-Open Patent Publication No. 2-216161).

DISCLOSURE OF THE INVENTION

As a result of accumulating active studies for solving the problems of the conventional art, the present inventors found that a polycarbonate resin formed of a novel monomer having a phenanthrene skeleton is useful as a material for various sheets and films which are required to be heat-resistant, and completed the present invention.

The present inventors also found that an electrophotographic photosensitive body using such a polycarbonate as the binder resin has high abrasion resistance, and completed the present invention.

One embodiment of the present invention is directed to a polycarbonate resin, comprising a structural unit represented by the following general formula (I), wherein the structural unit of general formula (I) occupies 5 to 100 mol % relative to all the structural units, and the limiting viscosity of the polycarbonate resin is 0.3 to 2.0 dl/g.

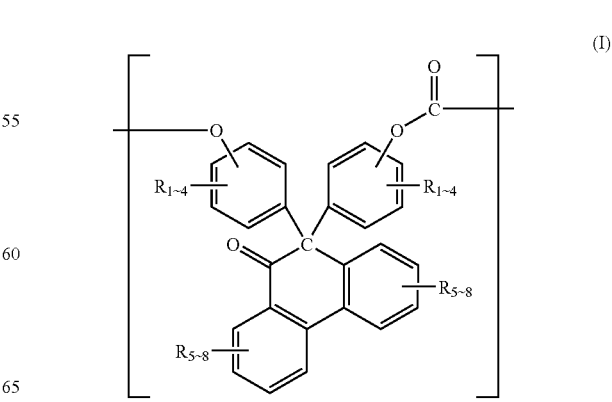

In the formula, $R_1$ through $R_8$ independently represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17.

A preferable embodiment of the present invention is directed to a polycarbonate resin, further comprising a structural unit represented by the following general formula (II).

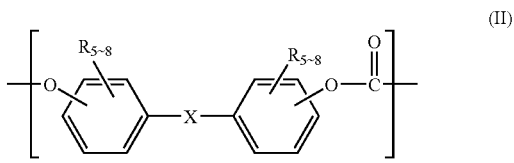

In the formula, $R_5$ through $R_8$ independently represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17; and X represents:

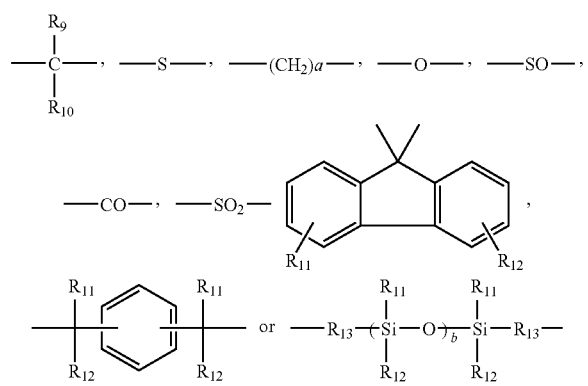

where $R_9$ and $R_{10}$ independently represent a hydrogen atom, a fluorine atom, a chlorine atom, a bromine atom, an iodine atom, an alkyl group having a carbon number of 1 through 9, an alkoxy group having a carbon number of 1 through 5, an aryl group having a carbon number of 6 through 12, an alkenyl group having a carbon number of 2 through 5, or an aralkyl group having a carbon number of 7 through 17; and $R_9$ and $R_{10}$ may be bonded together to form a carbon ring or a heterocycle;

$R_{11}$ and $R_{12}$ independently represent a hydrogen atom, a fluorine atom, a chlorine atom, a bromine atom, an iodine atom, an alkyl group having a carbon number of 1 through 9, an alkoxy group having a carbon number of 1 through 5, or an aryl group having a carbon number of 6 through 12; $R_{13}$ is an alkylene group having a carbon number of 1 through 9; and "a" represents an integer of 0 through 20, and "b" represents an integer of 1 through 500.

The alkyl group having a carbon number of 1 through 9, the aryl group having a carbon number of 6 through 12, the alkenyl group having a carbon number of 2 through 5, the alkoxy group having a carbon number of 1 through 5, or the aralkyl group having a carbon number of 7 through 17 represented by $R_1$ through $R_8$ may further have a substituent. As such a substituent, an alkyl group having a carbon number of 1 through 5, an alkenyl group having a carbon number of 2 through 5, or an alkoxy group having a carbon number of 1 through 5 is usable.

The alkyl group having a carbon number of 1 through 9, the alkoxy group having a carbon number of 1 through 5, an aryl group having a carbon number of 6 through 12, the alkenyl group having a carbon number of 2 through 5, or the aralkyl group having a carbon number of 7 through 17 represented by $R_9$ or $R_{10}$ may further have a substituent. As such a substituent, an alkyl group having a carbon number of 1 through 5, an alkoxy group having a carbon number of 1 through 5, an alkenyl group having a carbon number of 2 through 5, or a halogen group selected from fluorine, chlorine, bromine and iodine is usable. The alkyl group having a carbon number of 1 through 9, the alkoxy group having a carbon number of 1 through 5, or the aryl group having a carbon number of 6 through 12 represented by $R_{11}$ or $R_{12}$ may further have a substituent. As such a substituent, an alkyl group having a carbon number of 1 through 5, an alkoxy group having a carbon number of 1 through 5, or a halogen group selected from fluorine, chlorine, bromine and iodine is usable. The alkylene group having a carbon number of 1 through 9 represented by $R_{13}$ may further have a substituent.

A preferable embodiment of the present invention is directed to a polycarbonate resin, wherein the structural unit of general formula (I) occupies 10 to 100 mol % relative to all the structural units, and the limiting viscosity of the polycarbonate resin is 0.4 to 1.5 dl/g. Another preferable embodiment of the present invention is directed to a polycarbonate resin, wherein the structural unit of general formula (II) is derived from 2,2-bis(4-hydroxyphenyl)propane, 2,2-bis(4-hydroxy-3-methylphenyl)propane, bis(4-hydroxyphenyl)ether, 1,1-bis(4-hydroxyphenyl)cyclohexane, or 1,1-bis(4-hydroxyphenyl)-1-phenylethane. Another preferable embodiment of the present invention is directed to a heat-resistant polycarbonate resin film produced using the above polycarbonate resin. Another preferable embodiment of the present invention is directed to a heat-resistant polycarbonate resin sheet produced using the above polycarbonate resin.

Another embodiment of the present invention is directed to an electrophotographic photosensitive body comprising a photosensitive layer on a conductive substrate, wherein a polycarbonate resin having a structural unit represented by the following general formula (I) is used as a binder resin for the photosensitive layer.

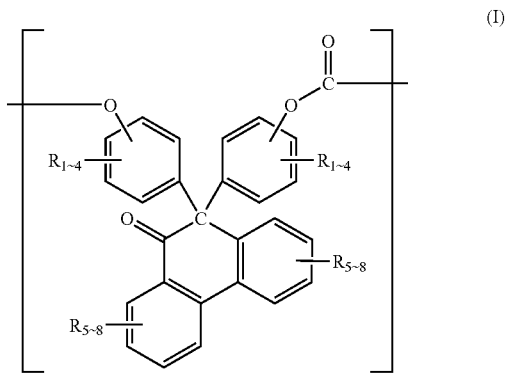

In the formula, $R_1$ through $R_8$ independently represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17.

A preferable embodiment of the present invention is directed to an electrophotographic photosensitive body, wherein the structural unit represented by general formula (I) is derived from any of the following compounds.

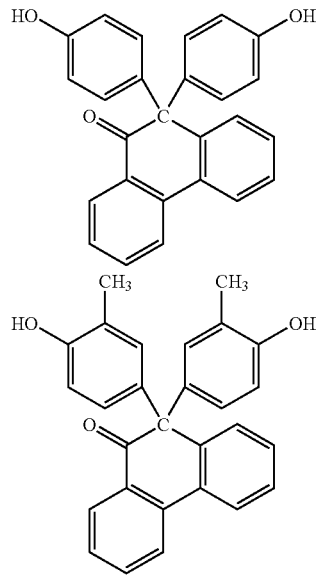

Another preferable embodiment of the present invention is directed to an electrophotographic photosensitive body, wherein the structural unit of general formula (I) occupies 5 to 100 mol % relative to all the structural units. Another preferable embodiment of the present invention is directed to an electrophotographic photosensitive body, wherein a polycarbonate structural unit other than the structural unit represented by general formula (I) is derived from at least one compound selected from the group of bisphenols consisting of 1,1'-biphenyl-4,4'-diol, 1,1-bis(4-hydroxyphenyl)ethane, bis(4-hydroxyphenyl)ether, 2,2-bis(4-hydroxyphenyl)propane, 2,2-bis(4-hydroxy-3-methylphenyl)propane, 1,1-bis(4-hydroxyphenyl)cyclohexane, and 1,1-bis(4-hydroxyphenyl)-1-phenylethane. Furthermore, another preferable embodiment of the present invention is directed to an electrophotographic photosensitive body, wherein the photosensitive layer is a charge carrier layer of a laminated-type electrophotographic photosensitive body.

BEST MODE FOR CARRYING OUT THE INVENTION

Polycarbonate Resin

A polycarbonate resin according to the present invention can be produced by a known method used for producing a polycarbonate from bisphenol A and a carbonic acid ester forming compound, for example, direct reaction of a bisphenol and phosgene (phosgene method), transesterification reaction (transesterification method) of a bisphenol and bisarylcarbonate, or the like.

A polycarbonate resin according to the present invention is produced using any of the following bisphenols as a material.

Namely, as bisphenols corresponding to the structural unit represented by general formula (I), compounds represented by the following general formula (III) are used. Such compounds may be used in a combination of two or more.

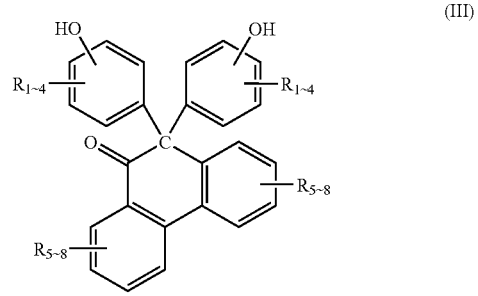

In the formula, $R_1$ through $R_8$ are the same as above.

Various bisphenols are represented by general formula (III) above. Specifically, compounds having the following formulas are preferably used, but usable bisphenols are not limited thereto.

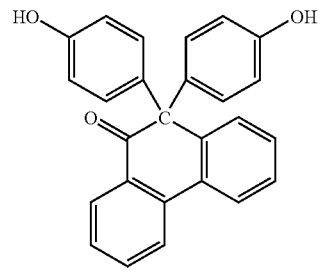

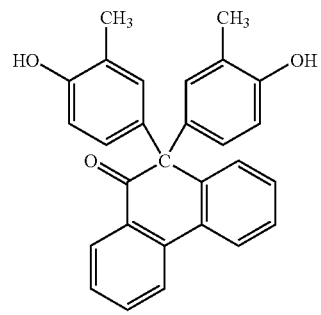

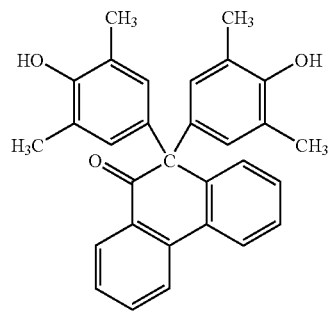

7
-continued
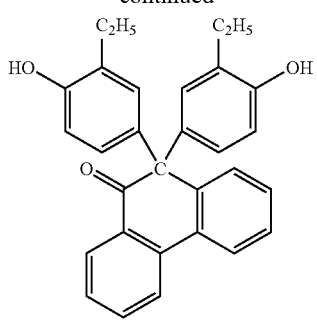
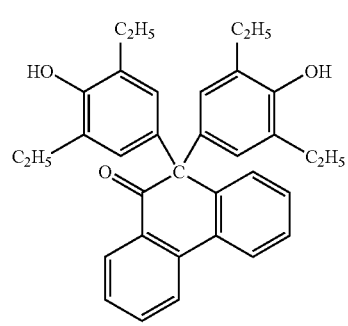
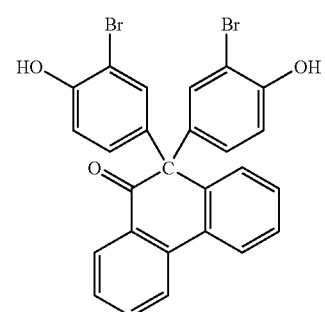
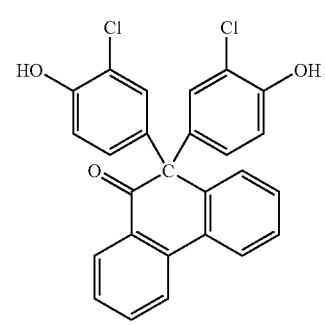
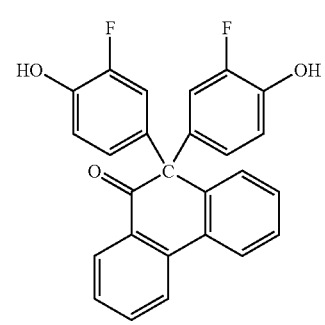
8
-continued
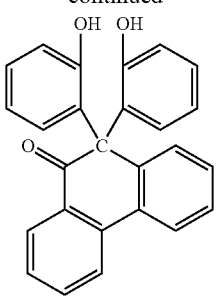
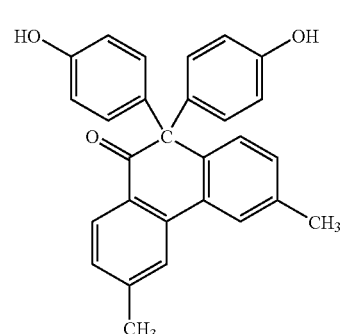
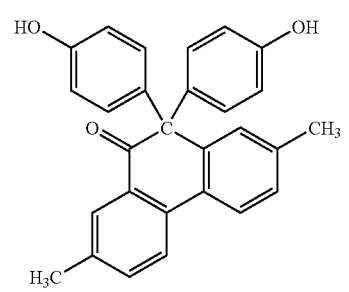
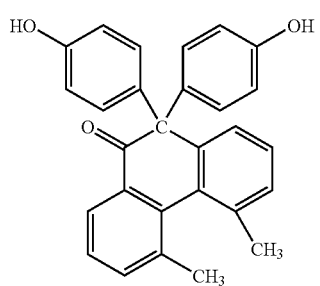
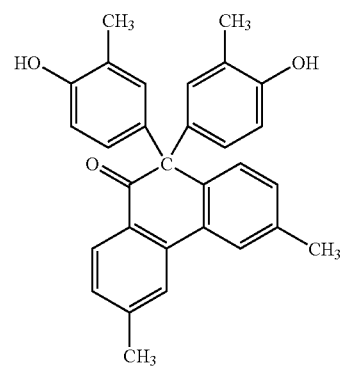

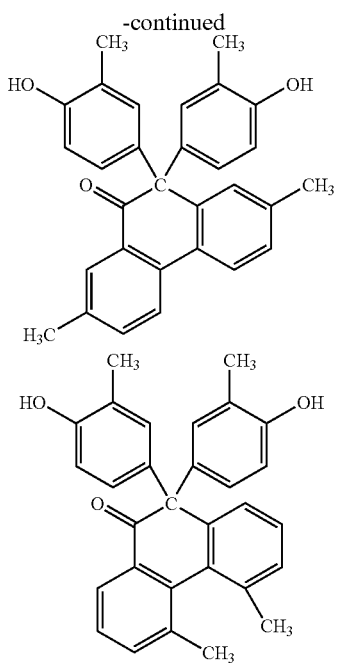

As bisphenols represented by general formula (II), the compounds represented by the following general formula (IV) are used. Such compounds may be used in a combination of two or more.

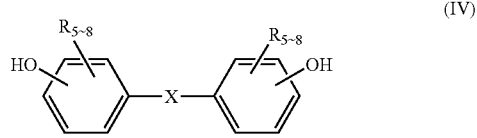

In the formula, $R_5$ through $R_8$ are the same as above.

Various bisphenols are represented by general formula (IV) above.

Specifically, such bisphenols include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, 4,4'-[1,3-phenylenebis(1-methylethylidene)]bisphenol, 1,1-bis(4-hydroxyphenyl)-1-phenylethane, and the like. These substances may be used in combination of two or more.

Among these substances, it is preferable to select a bisphenol from 2,2-bis(4-hydroxyphenyl)propane (bisphenol A: BPA), 2,2-bis(4-hydroxy-3-methylphenyl)propane (bisphenol C: BPC), bis(4-hydroxyphenyl)ether, 1,1-bis(4-hydroxyphenyl)cyclohexane (bisphenol Z: BPZ), and 1,1-bis(4-hydroxyphenyl)-1-phenylethane (bisphenol AP: BPAP). It is further preferable to select a bisphenol from BPA and BPZ.

The carbonic acid ester forming compounds include, for example, phosgene and bisarylcarbonates such as diphenyl carbonate, di-p-tolyl carbonate, phenyl-p-tolyl carbonate, di-p-chlorophenyl carbonate, dinaphthyl carbonate, and the like. These compounds may be used in combination of two or more.

Usually according to the phosgene method, a bisphenol represented by general formula (III), a bisphenol represented by general formula (IV) and phosgene are reacted under the presence of an acid binder and a solvent. As the acid binder, for example, any of hydroxides of alkaline metal such as pyridine, sodium hydroxide, potassium hydroxide, and the like is used. As the solvent, for example, any of methylene chloride, chloroform and the like is used. In addition, in order to promote the polycondensation reaction, it is preferable to add a tertiary amine such as triethylamine or the like, a quaternary ammonium salt, or the like as a catalyst. In order to adjust the polymerization degree, it is preferable to add a monofunctional compound such as phenol, p-t-butylphenol, p-cumylphenol, long-chain alkyl-substituted phenol, olefin-substituted phenol or the like as a molecular weight adjuster. Optionally, an antioxidant such as sodium sulfite, hydrosulfite or the like; or a branching agent such as phloroglucine, isatin bisphenol, or the like may be added in a small amount.

It is usually appropriate to perform the reaction at a temperature in the range of 0 to 150° C., preferably in the range of 5 to 40° C. The reaction time, which depends on the reaction temperature, is usually 0.5 minutes to 10 hours, preferably 1 minute to 2 hours. During the reaction, it is preferable to keep the pH of the reaction system at 10 or higher.

According to the transesterification method, a bisphenol represented by general formula (III), a bisphenol represented by general formula (IV) and bisarylcarbonate are mixed and reacted at a high temperature and a reduced pressure. The reaction is usually performed at a temperature in the range of 150 to 350° C., preferably in the range of 200 to 300° C. The pressure is reduced to a final pressure of 1 mmHg or lower, so that a phenol derived from the bisarylcarbonate generated by the transesterification reaction is removed outside the system. The reaction time, which depends on the reaction temperature or the pressure reduction degree, is usually about 1 to 4 hours. The reaction is preferably performed in an atmosphere of an inert gas such as nitrogen, argon or the like. Optionally, a molecular amount adjuster, an antioxidant or a branching agent may be added for the reaction.

In the obtained polycarbonate resin, the amount ratio of the structural unit represented by general formula (I) is 5 to 100 mol %, preferably 10 to 100 mol % relative to the total amount of the structural units represented by general formula (I) and general formula (II).

It is preferable that the polycarbonate resin according to the present invention has a limiting viscosity of 0.30 to 2.0 dl/g, more preferably 0.40 to 1.5 dl/g in order to have a sufficient strength as a film or sheet.

To the polycarbonate resin according to the present invention, an appropriate amount of any of various additives, for example, a polymer modifier, a heat stabilizer, an antioxidant, an optical stabilizer, a colorant, an antistatic agent, a lubricant, a plasticizer, a releasing agent, and the like may be incorporated For producing a film or sheet, an arbitrary method is usable. A solution cast method is especially preferable. As a solvent for the solution cast method, any of various solvents which can dissolve the polycarbonate copolymer is usable. Methylene chloride, tetrahydrofuran, dioxane and the like are preferable.

<Electrophotographic Photosensitive Body>

An electrophotographic photosensitive body according to the present invention may have a single photoconductive layer or a laminate of a plurality of photoconductive layers having different functions, on a conductive substrate. Recently, a two-layer laminated-type electrophotographic photosensitive body, including a charge generation layer for generating charges by being exposed and a charge carrier layer for carrying the charges, are mainstream. Optionally, an underlying layer, a protective layer, an adhesive layer or the like may be provided.

For a conductive support in the present invention, any of metal materials such as aluminum, stainless steel, nickel and the like; polyester film having a conductive layer of aluminum, palladium, tin oxide, indium oxide or the like on a surface thereof; phenol resins, paper and the like is usable.

The charge generation layer in the present invention is formed on the conductive support by a known method. Usable charge generation substances are, for example, azoxybenzene-based, disazo-based, trisazo-based, benzimidazole-based, polycyclic quinoline-based, indigoide-base, quinacridone-based, phthalocyanine-based, perylene-based, methine-based, or other organic pigments. When used, microparticles of such a charge generation substance are dispersed in a binder resin formed of any of polyvinyl butyral resins, polyvinyl formal resins, silicone resins, polyamide resins, polyester resins, polystyrene resins, polycarbonate resins, polyvinyl acetate resins, polyurethane resins, phenoxy resins, epoxy resins, various types of cellulose, and the like.

The charge carrier layer in the present invention is formed by dispersing a charge carrier substance on the charge generation layer by a known method, using the polycarbonate resin according to the present invention as the binder resin. Usable charge carrier substance are, for example, polytetracyanoethylene; fluorenone-based compounds such as 2,4,7-trinitro-9-fluorenone and the like; nitro compounds such as dinitroanthracene and the like; succinic anhydride; maleic anhydride; dibromo maleic anhydride; triphenylmethane-based compounds; oxadiazole-based compounds such as 2,5-di(4-dimethylaminophenyl)-1,3,4-oxadiazole and the like; styryl-based compounds such as 9-(4-diethylaminostyryl)anthracene and the like; carbazole-based compounds such as poly-N-vinylcarbazole and the like; pyrazoline-based compounds such as 1-phenyl-3-(p-dimethylaminophenyl)pyrazoline and the like; amine derivatives such as 4,4',4"-tris(N,N-diphenylamino)triphenylamine, N,N'-bis(3-methylphenyl)-N,N'-bis(phenyl)benzidine, and the like; conjugate unsaturated compounds such as 1,1-bis(4-diethylaminophenyl)-4,4-diphenyl-1,3-butadiene and the like; hydrazone-based compounds such as 4-(N,N-diethylamino)benzaldehyde-N,N-diphenylhydrazone and the like; nitrogen-containing cyclic compounds such as indole-based compounds, oxazole-based compounds, isoxazole-based compounds, thiazole-based compounds, thiadiazole-based compounds, imidazole-based compounds, pyrazole-based compounds, pyrazoline-based compounds, triazole-based compounds, and the like; fused polycyclic compounds; and the like. The above-mentioned charge carrier substances may be used independently or in a combination of a plurality thereof.

A polycarbonate according to the present invention can be produced by a known method used for producing a polycarbonate from bisphenol A and a carbonic acid ester forming compound, for example, direct reaction of a bisphenol and phosgene (phosgene method), transesterification reaction (transesterification method) of a bisphenol and bisarylcarbonate, or the like.

A bisphenol deriving the structural unit represented by general formula (I) of the polycarbonate resin according to the present invention is represented by the following general formula (III).

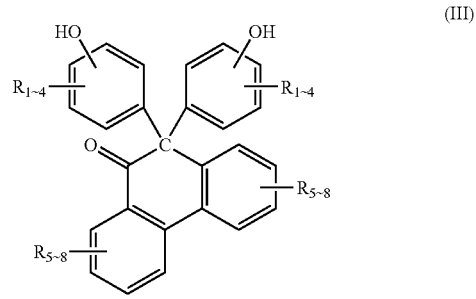

In the formula, $R_1$ through $R_8$ represent the groups equivalent to those in general formula (I).

Specifically, compounds having the following formulas are preferably used, but usable bisphenols are not limited thereto.

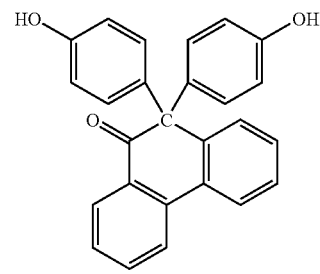

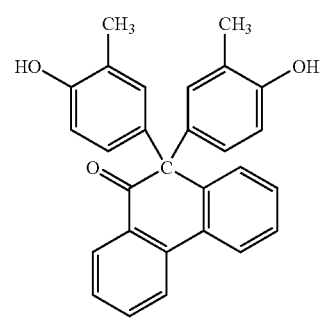

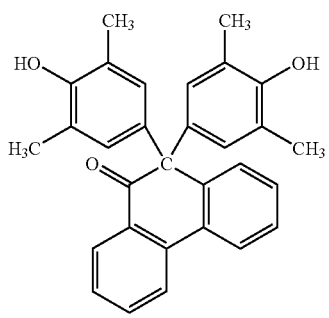

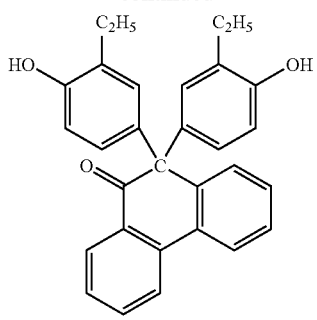
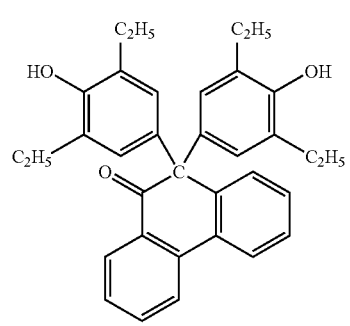
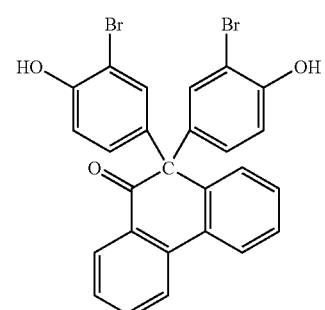
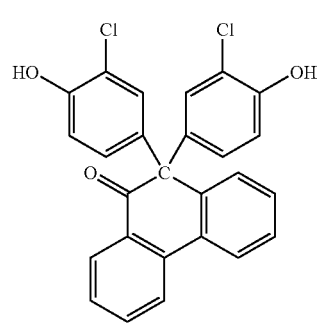
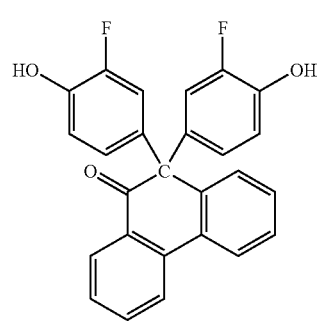
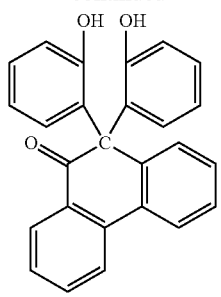
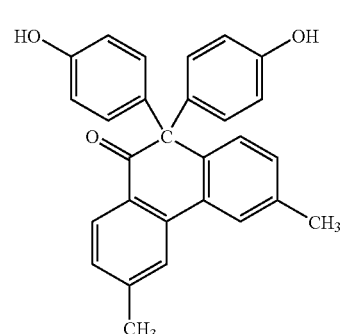
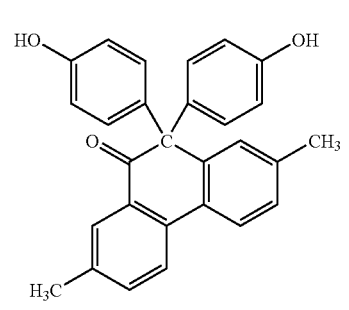
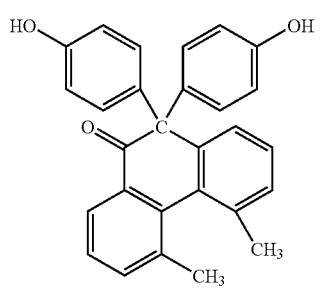
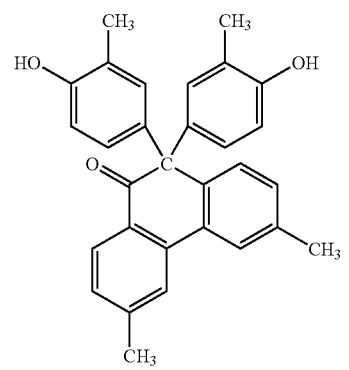

-continued

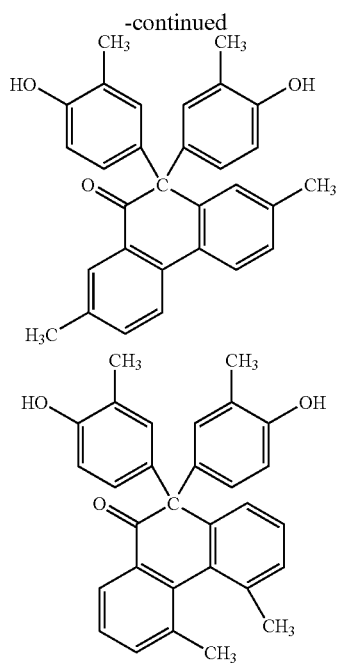

Among the above compounds, compounds represented by the following formulas are especially preferable.

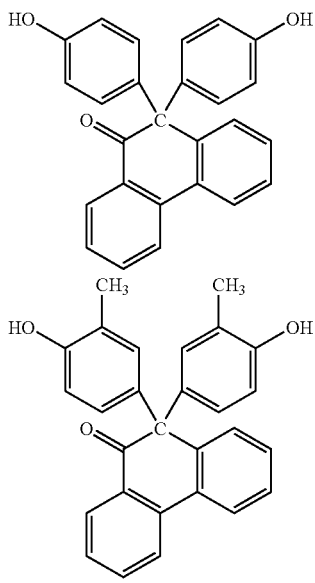

Specific examples of material bisphenols usable for producing the polycarbonate according to the present invention include 1,1'-biphenyl-4,4'-diol, bis(4-hydroxyphenyl)methane, bis(4-hydroxyphenyl)ether, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A: BPA), 2,2-bis(4-hydroxyphenyl)butane, 2,2-bis(4-hydroxy-3-t-butylphenyl)propane, 1,1-bis(4-hydroxyphenyl)cyclopentane, 1,1-bis(4-hydroxyphenyl)cyclohexane (bisphenol Z: BPZ), 1,1-bis(4-hydroxyphenyl)-3,3,5-trimethylcyclohexane, 2,2-bis(4-hydroxy-3-allylphenyl)propane, 2,2-bis(4-hydroxyphenyl)hexafluoropropane, 1,1-bis(4-hydroxyphenyl)-1-phenylethane, bis(4-hydroxyphenyl)diphenylmethane, 9,9-bis(4-hydroxyphenyl)fluorene, 9,9-bis(4-hydroxy-3-methylphenyl)fluorene, 4,4'-[1,4-phenylenebis(1-methylethylidene)]bisphenol, 4,4'-[1,3-phenylenebis(1-methylethylidene)]bisphenol, 4,4'-butylidenebis(3-methyl-6-t-butylphenol), α,ω-bis[3-(o-hydroxyphenyl)propyl]polydimethyldiphenyl random copolymer siloxane, α,ω-bis[3-(o-hydroxyphenyl)propyl]polydimethylsiloxane, and the like. These substances may be used in combination of two or more.

Among these substances, it is preferable to select a bisphenol from 1,1'-biphenyl-4,4'-diol, 1,1-bis(4-hydroxyphenyl)ethane, bis(4-hydroxyphenyl)ether, 2,2-bis(4-hydroxyphenyl)propane, 2,2-bis(4-hydroxy-3-methylphenyl)propane, 1,1-bis(4-hydroxyphenyl)cyclohexane, and 1,1-bis(4-hydroxyphenyl)-1-phenylethane. It is especially preferable to select a bisphenol from 2,2-bis(4-hydroxyphenyl)propane and 1,1-bis(4-hydroxyphenyl)cyclohexane.

The carbonic acid ester forming compounds include, for example, bisarylcarbonates such as phosgene, triphosgene, diphenyl carbonate, di-p-tolyl carbonate, phenyl-p-tolyl carbonate, di-p-chlorophenyl carbonate, dinaphthyl carbonate, and the like. These compounds may be used in combination of two or more.

Usually according to the phosgene method, the above-described bisphenol(s) and phosgene are reacted under the presence of an acid binder and a solvent. As the acid binder, for example, any of hydroxides of alkaline metal such as pyridine, sodium hydroxide, potassium hydroxide, and the like is used. As the solvent, for example, any of methylene chloride, chloroform, monochlorobenzene, and the like is used. In addition, in order to promote the polycondensation reaction, a tertiary amine catalyst such as triethylamine or the like, or a quaternary ammonium salt such as benzyltriethylammonium chloride or the like is used. It is preferable to add a monofunctional compound such as phenol, p-t-butylphenol, p-cumylphenol, long-chain alkyl-substituted phenol or the like as a molecular weight adjuster. Optionally, an antioxidant such as sodium sulfite, hydrosulfite or the like; or a branching agent such as phloroglucine, isatin bisphenol, trisphenolethane, or the like may be added in a small amount. It is usually appropriate to perform the reaction at a temperature in the range of 0 to 150° C., preferably in the range of 5 to 40° C. The reaction time, which depends on the reaction temperature, is usually 0.5 minutes to 10 hours, preferably 1 minute to 2 hours. During the reaction, it is preferable to keep the pH of the reaction system at 10 or higher.

According to the transesterification method, the above-described bisphenol(s) and bisarylcarbonate are mixed and reacted at a high temperature and a reduced pressure. The reaction is usually performed at a temperature in the range of 150 to 350° C., preferably in the range of 200 to 300° C. The pressure is reduced to a final pressure of 1 mmHg or lower, so that a phenol derived from the bisarylcarbonate generated by the transesterification reaction is removed outside the system. The reaction time, which depends on the reaction temperature or the pressure reduction degree, is usually about 1 to 24 hours. The reaction is preferably performed in an atmosphere of an inert gas such as nitrogen, argon or the like. Optionally, a molecular amount adjuster, an antioxidant or a branching agent may be added for the reaction.

In the polycarbonate resin according to the present invention, the amount ratio of the structural unit represented by general formula (I) is preferably in the range of 5 to 100 mol %, more preferably 10 to 100 mol % relative to all the structural units of polycarbonate.

The polycarbonate resin synthesized by any of these reactions is easily moldable by a known wet molding method used for producing an electrophotographic photosensitive body, for example, a solution cast method, a cast method, a spray method, a dip method, or the like. It is preferable that an electrophotographic photosensitive body molded by wet molding preferably has a limiting viscosity of 0.30 to 2.0 dl/g in order to have a sufficient film strength. When the ease of film formation and film strength are considered important, the limiting viscosity thereof is more preferably 0.40 to 1.5 dl/g.

Solvents usable for the wet molding include, for example, halogen-based organic solvents such as dichloromethane, chloroform, monochlorobenzene, 1,1,1-trichloroethane, monochloroethane, carbon tetrachloride, and the like; aromatic hydrogen carbonates such as toluene, xylene and the like; ketones such as acetone, methylethylketone, cyclohexanone, isophorone and the like; ethers such as tetrahydrofran, 1,4-dioxane, ethyleneglycoldiethylether, ethyl cellosolve and the like; esters such as methyl acetate, ethyl acetate and the like; and non-halogen-based organic solvents such as dimethylformamide, dimethyl sulfoxide, diethylformamide, and the like. In the present invention, these solvents may be used independently or in a combination of two or more. For dissolving a polycarbonate according to the present invention in a solvent to form a charge carrier layer, it is preferable to use a resin solution in the range of 1 to 40% by weight.

The polycarbonate resin according to the present invention may be arbitrarily blended with other synthetic resins in a range in which the effect of the polycarbonate resin is maintained. Such usable synthetic resins include, for example, vinyl polymers such as polymethylmethacrylate, polystyrene, poly(vinyl chloride) and the like, and copolymers thereof, and various thermoplastic and thermosetting resins such as polycarbonate, polyester, polysulfone, phenoxy resins, epoxy resins, silicone resins and the like. Any of various ultraviolet absorbers, antioxidants and the like may be optionally added.

The mixing ratio of the charge generation substance and the binder resin is preferably in the range of 10:1 to 1:20. The thickness of the charge generation layer is 0.01 to 20 µm, preferably 0.1 to 2 µm. The mixing ratio of the charge carrier substance and the binder resin is preferably in the range of 10:1 to 1:10. The thickness of the charge carrier layer is 2 to 100 µm, preferably 5 to 30 µm.

EXAMPLES

Hereinafter, the present invention will be described in detail by way of examples. The present invention is not limited to the following examples.

Example 1

In 1100 ml of 5 w/w % aqueous solution of sodium hydroxide, 228.4 g (0.4 mol) of 10,10-bis(4-hydroxyphenyl)-9-phenanthrenequinone (hereinafter, referred to simply as "BPPQ"; produced by Honshu Chemical Industry Co., Ltd.) and 0.1 g of hydrosulfite were dissolved.

To the resultant substance, 500 ml of methylene chloride was added. While stirring and keeping the mixture at 15° C., 60 g of phosgene was blown therein over 60 minutes.

After the step of blowing in phosgene was finished, 1.67 g of p-t-butylphenol (hereinafter, referred to simply as "PTBP"; produced by Dainippon Ink and Chemicals, Incorporated) was added as a molecular weight adjuster, and actively stirred to emulsify the reaction solution. After the solution was emulsified, 0.4 ml of triethylamine was added and stirred at 20 to 25° C. for 1 hour to cause polymerization.

After the step of polymerization was finished, the reaction solution was separated into an aqueous phase and an organic phase. The organic phase was neutralized with phosphoric acid, and repeatedly washed with water until the conductivity of the washing solution (aqueous phase) reached 10 µS/cm or lower. The obtained polymer solution was dropped to warm water kept at 45° C. and the solvent was removed by evaporation to obtain a white powdery precipitate. The obtained precipitate was filtrated and dried at 105° C. for 24 hours to obtain a powdery polymer.

A solution of this polymer using methylene chloride as a solvent and having a concentration of 0.5 g/dl had a limiting viscosity of 0.60 dl/g at 20° C. As a result of analyzing the obtained polymer with infrared absorption spectroscopy, absorption by carbonyl group wad recognized at a position at or in the vicinity of 1770 cm$^{-1}$ and absorption by ether bond wad recognized at a position at or in the vicinity of 1240 cm$^{-1}$. Thus, the polymer was confirmed to be a polycarbonate resin having a carbonate bond.

A methylene chloride solution of this polycarbonate resin was cast to obtain a film having a thickness of 50 µm. This film was subjected to a pressure cooker test at 120° C. for 96 hours. 12 days after the temperature was returned to room temperature, the film was observed and evaluated regarding haze and presence/absence of deformation. The results are shown in Table 1.

[Haze (Transparency)]

Haze was measured by a haze meter (model: 300A) produced by Nippon Denshoku Industries Co., Ltd. in conformity with JIS K7105 (1981).

[Deformation]

12 days after the thermal treatment was performed, the deformation state of the film was visually observed and evaluated by the following criteria.

○: The film is not much waved and not much deformed.
Δ: The film is slightly waved, but not largely deformed.
X: The film is significantly waved and largely deformed.

Example 2

The same procedure was performed as in Example 1 except that 239.6 g (0.4 mol) of 10,10-bis(3-methyl-4-hydroxyphenyl)-9-phenanthrenequinone (hereinafter, referred to simply as "BCPQ"; produced by Honshu Chemical Industry Co., Ltd.) was used instead of BPPQ.

Example 3

The same procedure was performed as in Example 1 except that 114.2 g (0.2 mol) of BPPQ and 45.6 g (0.2 mol) of BPA were used.

Example 4

The same procedure was performed as in Example 1 except that 114.2 g (0.2 mol) of BPPQ and 53.6 g (0.2 mol) of BPZ were used.

Example 5

The same procedure was performed as in Example 1 except that 119.8 g (0.2 mol) of BCPQ was used instead of BPPQ, and 53.6 g (0.2 mol) of BPZ was used.

Comparative Example 1

A commercially available polycarbonate resin film (Panlite Film PC-2151, produced by Teijin Chemicals, Ltd.; thickness: 125 μm) was subjected to a pressure cooker test at 120° C. for 96 hours as in the above examples. 12 days after the temperature was returned to room temperature, the film was observed and evaluated regarding haze and presence/absence of deformation. The results are shown in Table 1.

Comparative Example 2

The same procedure was performed as in Example 1 except that 107.2 g (0.4 mol) of BPZ was used instead of BPPQ.

Comparative Example 3

The same procedure was performed as in Example 1 except that 102.4 g (0.4 mol) of BPC was used instead of BPPQ.

TABLE 1

| | Bisphenol component (mol %) | | | Limiting viscosity | Haze | Deformation |
|---|---|---|---|---|---|---|
| | General formula (I) | General formula (II) | Others | | | |
| Example 1 | BPPQ(100) | — | — | 0.60 | 0.19 | ○ |
| Example 2 | BCPQ(100) | — | — | 0.59 | 0.25 | ○ |
| Example 3 | BPPQ(50) | BPA(50) | — | 0.59 | 0.26 | ○ |
| Example 4 | BPPQ(50) | BPZ(50) | — | 0.56 | 0.21 | ○ |
| Example 5 | BCPQ(50) | BPZ(50) | — | 0.55 | 0.23 | ○ |
| Comparative example 1 | — | — | BPA(100) | — | 0.68 | X |
| Comparative example 2 | — | — | BPZ(100) | 0.51 | 0.59 | Δ |
| Comparative example 3 | — | — | BPC(100) | 0.50 | 0.72 | X |

Bisphenol component: Ratio of each bisphenol relative to all the bisphenol components (mol %)
BPPQ: 10,10-bis(4-hydroxyphenyl)-9-phenanthrene-quinone
BCPQ: 10,10-bis(3-methyl-4-hydroxyphenyl)-9-phenanthrenequinone
BPA: 2,2-bis(4-hydroxyphenyl)propane
BPZ: 1,1-bis(4-hydroxyphenyl)cyclohexane
BPC: 2,2-bis(4-hydroxy-3-methylphenyl)propane
Limiting viscosity: Measured using Ubbelohde viscosimeter at 20° C. with 0.5% dichloromethane solution and Huggins constant of 0.45.
Haze: A pressure cooker test was performed at 120° C. for 96 hours. 12 days after the temperature was returned to room temperature, haze was measured by a haze meter (model: 300A) produced by Nippon Denshoku Industries Co., Ltd. in conformity with JIS K7105 (1981).
Deformation: A pressure cooker test was performed at 120° C. for 96 hours. 12 days after the temperature was returned to room temperature, the deformation state was visually observed and evaluated by the following criteria.
○: The film is not much waved and not much deformed.
Δ: The film is slightly waved, but not largely deformed.
X: The film is significantly waved and largely deformed.

Example 6

A polycarbonate resin was produced in the same manner as in Example 1.
Then, a coating solution was produced using 50 parts by weight of N,N'-bis(3-methylphenyl)-N,N'-bis(phenyl)benzidine (ST16/1.2 produced by SYNTEC), 50 parts by weight of the polycarbonate resin obtained by the synthesis and polymerization described above, 50 parts by weight of tetrahydrofran, and 300 parts by weight of toluene. The coating solution was applied to a commercially available LBP photosensitive body (LPA3ETC4 produced by Seiko Epson Corporation) deprived of the charge carrier layer by tetrahydrofran in advance, air-dried, and then dried at 10° C. for 8 hours. A charge carrier layer having a thickness of about 20 μm was provided thereon. Thus, a laminated-type electrophotographic photosensitive body (hereinafter, referred to as "OPC") was produced.

On a surface of the produced OPC, an HB pencil scratch hardness test was performed at 10 positions at a direction of 90 degrees with respect to the rotation direction in conformity with JIS 5600. After the external appearance thereof was observed, the OPC was mounted on a commercially available LBP (LBP-8400; produced by Seiko Epson Corporation) and 5000 recycled paper sheets for office equipment use (LBP-190R-A4B; produced by Tochiman Kabushiki Kaisha) were entirely printed black successively. Then, the abrasion amount of the OPC was measured.

Example 7

The same procedure was performed as in Example 6 except that 239.6 g (0.4 mol) of BCPQ was used instead of BPPQ.

Example 8

The same procedure was performed as in Example 6 except that 114.2 g (0.2 mol) of BPPQ and 45.6 g (0.2 mol) of BPA were used.

Example 9

The same procedure was performed as in Example 6 except that 114.2 g (0.2 mol) of BPPQ and 53.6 g (0.2 mol) of BPZ were used.

Example 10

The same procedure was performed as in Example 6 except that 119.8 g (0.2 mol) of BCPQ was used instead of BPPQ, and 53.6 g (0.2 mol) of BPZ was used.

Comparative Example 4

An OPC was produced by molding and the performance was evaluated as in Example 6 except that a coating solution was produced using a commercially available BPA-type homopolycarbonate resin (Iupilon S-2000 produced by Mitsubishi Engineering-Plastics Corporation; limiting viscosity:

0.51 dl/g) instead of the polycarbonate resin used in Example 6 and using 530 parts by weight of methylene chloride instead of tetrahydrofran and toluene.

Comparative Example 5

An OPC was produced by molding and the performance was evaluated as in Example 6 except that a BPZ-type homopolycarbonate resin (PCZ-400 produced by Mitsubishi Gas Chemical Company, Inc.; limiting viscosity: 0.76 dl/g), which is a commercially available binder resin for electrophotographic photosensitive bodies, was used instead of the polycarbonate resin used in Example 6.

TABLE 2

| | Bisphenol component (mol %) | | | Limiting viscosity | HB pencil scratch hardness test | Abrasion amount of OPC (mg) |
|---|---|---|---|---|---|---|
| | General formula (I) | General formula (II) | Others | | | |
| Example 6 | BPPQ(100) | — | — | 0.60 | 0.19 | 45 |
| Example 7 | BCPQ(100) | — | — | 0.59 | 0.25 | 49 |
| Example 8 | BPPQ(50) | BPA(50) | — | 0.59 | 0.26 | 55 |
| Example 9 | BPPQ(50) | BPZ(50) | — | 0.56 | 0.21 | 53 |
| Example 10 | BCPQ(50) | BPZ(50) | — | 0.55 | 0.23 | 52 |
| Comparative example 4 | — | — | BPA(100) | 0.51 | 0.68 | 81 |
| Comparative example 5 | — | — | BPZ(100) | 0.76 | 0.59 | 70 |

<Explanation of Symbols in the Table>

HB pencil scratch hardness test: On a pencil scratch testing machine for coating films (produced by Kabushiki Kaisha Imoto Seisakusho), a commercially available HB pencil (Uni produced by Mitsubishi Pencil Co., Ltd.) was set. On a surface of the produced photosensitive body, an HB pencil scratch hardness test was performed at 10 positions at a direction of 90 degrees with respect to the rotation direction in conformity with JIS 5600. The external appearance thereof was observed with fluorescent light. A photosensitive body recognized to be scratched at all the 10 positions was evaluated as X, a photosensitive body recognized to be scratched at 1 to 5 positions was evaluated as Δ, and a photosensitive body not recognized to be scratched at all was evaluated as ○. Abrasion resistance of the photosensitive body: An OPC after the HB pencil scratch hardness test was mounted on a commercially available LBP (LBP-8400; produced by Seiko Epson Corporation) and 5000 recycled paper sheets for office equipment use (LBP-190R-A4B; produced by Tochiman Kabushiki Kaisha) were entirely printed black successively. Then, the abrasion amount of the OPC was measured.

INDUSTRIAL APPLICABILITY

A polycarbonate resin according to the present invention is a resin formed of a monomer having a phenanthrene skeleton. A polycarbonate film or sheet formed of the polycarbonate resin according to the present invention has a better heat resistance than the conventional polycarbonate film or sheet, and is applicable to packaging materials subjected to high temperature, high pressure vapor sterilization processing (namely, retort processing), optical films required to be heat-resistant, and the like.

An electrophotographic photosensitive body according to the present invention uses a polycarbonate resin having a phenanthrene skeleton as a binder, and therefore is superior in resistance against pencil scratch and abrasion resistance than in the case where a conventional binder resin for electrophotographic photosensitive bodies is used. Therefore, the present invention is effective to extend the life of the photosensitive body for copiers or printers and to improve the workability of maintenance.

The invention claimed is:

1. A polycarbonate resin comprising a structural unit represented by the following general formula (I), wherein the structural unit of general formula (I) occupies 5 to 100 mol % relative to all the structural units, and a limiting viscosity of the polycarbonate resin is 0.3 to 2.0 dl/g:

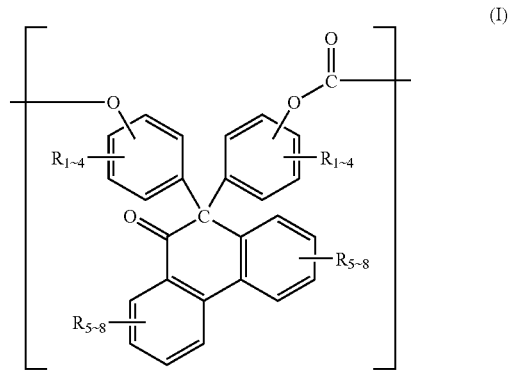

wherein in the formula, $R_1$ through $R_8$ independently represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17.

2. The polycarbonate resin according to claim 1, further comprising a structural unit represented by the following general formula (II):

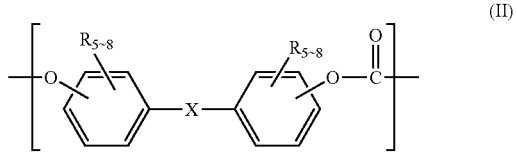

wherein in the formula, $R_5$ through $R_8$ independently represent a hydrogen atom, a halogen group, an alkyl group having a carbon number of 1 through 9, an aryl group having a carbon number of 6 through 12; an alkenyl group having a carbon number of 2 through 5, an alkoxy group having a carbon number of 1 through 5, or an aralkyl group having a carbon number of 7 through 17; and X represents:

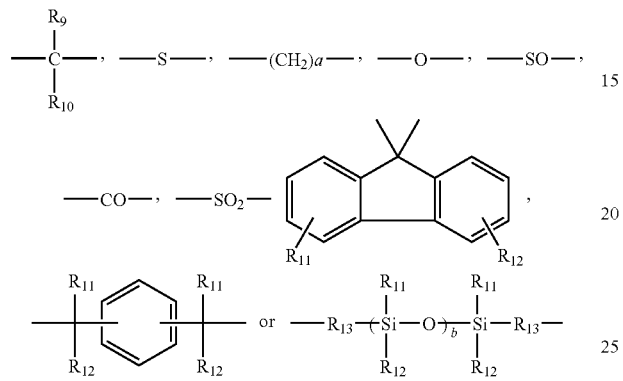

where $R_9$ and $R_{10}$ independently represent a hydrogen atom, a fluorine atom, a chlorine atom, a bromine atom, an iodine atom, an alkyl group having a carbon number of 1 through 9, an alkoxy group having a carbon number of 1 through 5, an aryl group having a carbon number of 6 through 12, an alkenyl group having a carbon number of 2 through 5, or an aralkyl group having a carbon number of 7 through 17; and $R_9$ and $R_{10}$ may be bonded together to form a carbon ring or a heterocycle;

$R_{11}$ and $R_{12}$ independently represent a hydrogen atom, a fluorine atom, a chlorine atom, a bromine atom, an iodine atom, an alkyl group having a carbon number of 1 through 9, an alkoxy group having a carbon number of 1 through 5, or an aryl group having a carbon number of 6 through 12; $R_{13}$ is an alkylene group having a carbon number of 1 through 9; and "a" represents an integer of 0 through 20, and "b" represents an integer of 1 through 500.

3. The polycarbonate resin according to claim 1, wherein the structural unit of general formula (I) occupies 10 to 100 mol % relative to all the structural units, and the limiting viscosity of the polycarbonate resin is 0.4 to 1.5 dl/g.

4. The polycarbonate resin according to claim 2, wherein the structural unit of general formula (II) is derived from 2,2-bis(4-hydroxyphenyl)propane, 2,2-bis(4-hydroxy-3-methylphenyl)propane, bis(4-hydroxyphenyl)ether, 1,1-bis(4-hydroxyphenyl)cyclohexane, or 1,1-bis(4-hydroxyphenyl)-1-phenylethane.

5. A heat-resistant polycarbonate resin film produced using the polycarbonate resin according to claim 1.

6. A heat-resistant polycarbonate resin sheet produced using the polycarbonate resin according to claim 1.

7. An electrophotographic photosensitive body comprising a photosensitive layer on a conductive substrate, wherein a polycarbonate resin having a structural unit represented by the following general formula (I) is used as a binder resin for the photosensitive layer:

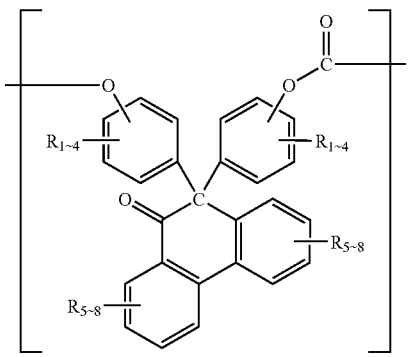

wherein in the formula, $R_1$ through $R_8$ represent a hydrogen atom, a halogen group, an alkyl group having a carbon number of 1 through 9, an aryl group having a carbon number of 6 through 12, an alkenyl group having a carbon number of 2 through 5, an alkoxy group having a carbon number of 1 through 5, or an aralkyl group having a carbon number of 7 through 17.

8. The electrophotographic photosensitive body according to claim 7, wherein the structural unit represented by general formula (I) is derived from any of the following compounds:

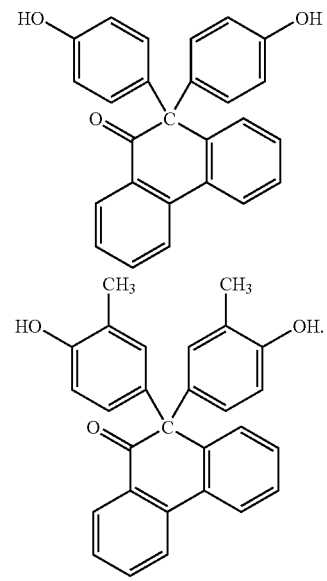

9. The electrophotographic photosensitive body according to claim 7, wherein the structural unit of general formula (I) occupies 5 to 100 mol % relative to all the structural units.

10. The electrophotographic photosensitive body according to claim 7, wherein a polycarbonate structural unit other than the structural unit represented by general formula (I) is derived from at least one compound selected from the group of bisphenols consisting of 1,1'-biphenyl-4,4'-diol, 1,1-bis(4-hydroxyphenyl)ethane, bis(4-hydroxyphenyl)ether, 2,2-bis (4-hydroxyphenyl)propane, 2,2-bis(4-hydroxy-3-methylphenyl)propane, 1,1-bis(4-hydroxyphenyl)cyclohexane, and 1,1-bis(4-hydroxyphenyl)-1-phenylethane.

11. The electrophotographic photosensitive body according to claim 7, wherein the photosensitive layer is a charge carrier layer of a laminated electrophotographic photosensitive body.

* * * * *